United States Patent [19]
Heinsohn et al.

[11] 3,839,699
[45] Oct. 1, 1974

[54] AIRCRAFT STALL WARNING INDICATOR SYSTEM BASED ON RATE OF CHANGE OF ANGLE OF ATTACK

[75] Inventors: Allan B. Heinsohn, Valley Cottage; Donald M. Neary, Pearl River, both of N.Y.

[73] Assignee: Monitair Corp.

[22] Filed: Sept. 1, 1971

[21] Appl. No.: 177,106

Related U.S. Application Data

[63] Continuation of Ser. No. 847,575, Aug. 5, 1969, abandoned.

[52] U.S. Cl. .............................................. 340/27 SS
[51] Int. Cl. ................................................ G08g 5/00
[58] Field of Search ................... 340/27 SS, 27 NA; 244/77 D; 73/180; 37/178 R

[56] References Cited
UNITED STATES PATENTS

| | | |
|---|---|---|
| 2,193,077 | 3/1940 | Saxman, Jr. ............................ 73/180 |
| 3,037,725 | 6/1962 | Treffeisen ............................. 244/77 |
| 3,208,277 | 9/1965 | Hays, Jr. ................................. 73/180 |

*Primary Examiner*—William C. Cooper
*Assistant Examiner*—Thomas L. Kundert
*Attorney, Agent, or Firm*—Dugger, Peterson, Johnson & Westman

[57] ABSTRACT

A signal corresponding to the rate of change of the angle of attack of an aircraft is derived and is operatively summed with a signal corresponding to the actual angle of attack. The resulting signal is compared to a reference level and a stall warning signal, indicating a predetermined time remaining until stall is produced when the former signal bears a predetermined relation to the latter.

10 Claims, 1 Drawing Figure

PATENTED OCT 1 1974
3,839,699
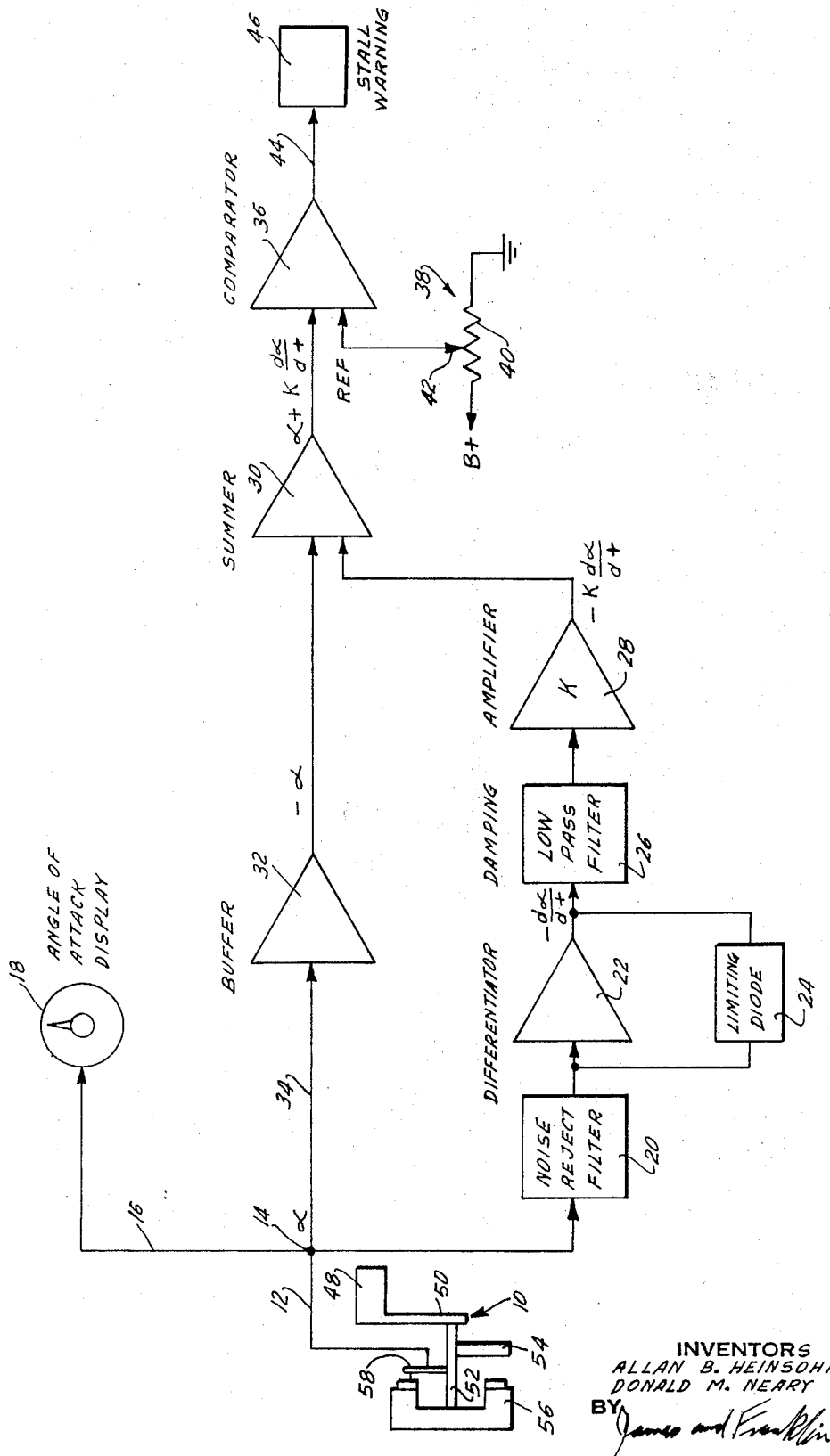
INVENTORS
ALLAN B. HEINSOHN
DONALD M. NEARY
BY
ATTORNEY

AIRCRAFT STALL WARNING INDICATOR SYSTEM BASED ON RATE OF CHANGE OF ANGLE OF ATTACK

This is a continuation, of application Ser. No. 847,575, filed Aug. 5, 1969 and now abandoned.

The present invention relates to a stall warning indicator system for use on aircraft, and particularly to a system of this type in which an indication is given on the basis of the time remaining until a stall condition will occur.

For the safe operation of an aircraft it is important that the pilot have an indication of the angle of attack that his aircraft is making with respect to the direction of the oncoming air, and more significantly that he be provided with a warning when his aircraft is approaching a stall condition.

A stall condition will occur when, at a particular angle of attack and velocity of the aircraft, an insufficient coefficient of lift is developed on the aircraft wing. The great majority of aircraft are at present provided with stall warning systems which give a warning indication whenever a stall condition is imminent. Typical in the known stall warning systems is the use of a microswitch which is operatively associated with a vane. When the aircraft wing approaches a critical angle of attack, that is, an angle of attack at which the aircraft will stall, the switch is caused to close and a warning device, such as a lamp in the cockpit, is energized. The pilot is then made aware that he must quickly take suitable corrective measures to prevent a potentially disastrous stall condition.

The known systems, which operate in accordance with federal regulations, provide such a stall warning in terms of the velocity of the aircraft above the aircraft stalling velocity. Thus in a typical known stall warning system the pilot is warned of an impending stall condition when the aircraft is flying at between 5 and 10 miles per hour above the stall velocity for the then prevailing angle of attack.

As the useful power available in private and commercial aircraft has substantially increased in recent years, so has wing loading and aircraft performance factors in general. As a result, for a given angle of attack, the critical or stall velocity may now be more rapidly approached, and thus, for the prescribed stall warning velocity tolerance provided by the known systems of between 5 and 10 miles per hour, the effective time available to the pilot for him to take his corrective steps is correspondingly decreased. For example, for an aircraft approaching a stall velocity at a rate of one mile per hour per second, and employing a known stall warning system that provides a stall warning indication at an aircraft velocity of 5 miles per hour above stall velocity, the pilot is given approximately 5 seconds in which to correct the flight conditions to avoid a stall. However, if the aircraft is approaching a stall condition at a rate of 2 miles per hour per second, which is not unusual when the aircraft is negotiating a turn maneuver, the same stall warning indication will provide a time of only 2½ seconds in which the pilot may take appropriate action. This reduced time period provided by the known stall warning system may well be insufficient for the preoccupied pilot to suitably adjust his flight conditions. Tragic results may then follow.

It is thus clear that a warning device based solely on the detection of a predetermined aircraft velocity above stall does not satisfactorily meet the requirements of the new, high performance aircraft presently available for use.

It is an object of the present invention to provide an aircraft stall warning system in which the pilot is provided with sufficient time to recover from an impending stall condition for different conditions of flight.

It is a further object of the present invention to provide an aircraft stall warning system which provides a warning of imminent stall in terms of time rather than in terms of velocity.

It is another object of the present invention to provide a stall warning system which provides a greater margin of safety of aircraft operation by the use of a relatively simple, reliable and inexpensive system which may readily be adapted for use with practically any type of aircraft.

The present invention provides the pilot with a warning of an impending stall condition at a predetermined time before the occurrence of a stall. This warning is given at the same time before stall for all values of aircraft deceleration, that is, the rate at which the aircraft is approaching a stall condition. Thus for any aircraft deceleration rate, the pilot is provided with the same adequate time (e.g. 5 seconds) in which to take preventive or corrective measures to prevent the aircraft from stalling.

The system of the present invention operates in combination with a device for producing a first signal proportional to the aircraft angle of attack. That signal is operatively differentiated to produce a second signal which thus represents the rate of change of the aircraft angle of attack as a function of time. These two signals are operatively summed to produce a third signal which in turn corresponds to both the actual angle of attack of the aircraft and the rate at which the angle of attack is changing.

The amplitude of that third signal is then compared with a reference signal level. When the former equals or exceeds the latter, a stall warning signal is produced which is effective to actuate a stall warning indicator, such as a lamp or buzzer located in the cockpit. That indication is provided at a predetermined time interval prior to a stall condition for the then flight conditions, e.g., angle of attack and deceleration of the aircraft.

A factor may be introduced to assign relative weights to the two signals which, when summed to a predetermined level, produce the stall warning signal. That weighting factor, as well as the magnitude of the reference signal, may be adjusted to provide the stall warning indication at a desired time prior to a stall condition.

To the accomplishment of the above and to such other objects as may hereinafter appear, the present invention relates to the design and manner of operation of a stall warning indicator, as defined in the appended claims and as described in this specification, taken together with the accompanying drawing in which the single FIGURE is a schematic block diagram of the stall warning indicator of the present invention.

The stall warning device of the present invention provides a warning of an impending stall condition at a predetermined time prior to a stall for the prevailing flight conditions of the aircraft. This is a departure from the known stall warning systems which provide a warning in terms of the velocity of the aircraft above a stall condition. As shown in the single FIGURE, an electrical signal proportional to the instantaneous actual angle of attack is produced by an angle of attack measuring device generally designated 10. As is conventional that electrical signal, connected by a line 12 from measuring device 10 to a point 14, may be connected from point 14 by a line 16 to an angle of attack indicator 18 to provide the pilot with a visual indication of the aircraft angle of attack.

In accord with the stall warning device of the invention, that signal is differentiated to produce a second signal which is representative of the rate of change of the angle of attack with respect to time. These two signals, representing angle of attack and rate of change of angle of attack, with a suitable weighting factor preferably being introduced to one of the signals, are operatively summed to produce a third signal. That third signal is then compared to a reference signal to produce a stall warning signal when the former equals or exceeds the latter.

Referring once again to the drawing, the angle of attack signal from point 14 is fed through a noise reject filter 20 to the input of a differentiator 22 which in known manner produces an output signal $-d\alpha/d\tau$, that is, the inverse of the time derivative of its input signal. A transient limiting diode 24 may be connected as shown between the input and output of differentiator 22.

That output signal is fed through a low-pass filter 26 which suppresses high frequency noise signals, and from there it goes to the input of an amplifier 28 having an effective gain of K. The output analog signal of amplifier, $-K(d\alpha/d\tau)$ is applied to one input of a summer circuit 30.

The other input to summer circuit 30 is the inverted angle of attack signal $-\alpha$, which is produced at the output of a buffer, unity-gain amplifier 32, the input of which is connected by a line 34 to point 14. The summer circuit 30 is effective to operatively sum and invert its two input signals; its output signal thus corresponds to $\alpha + K(d\alpha/d\tau)$. That output signal is connected to one input of a differential amplifier comparator 36, the other input of which is a reference signal level produced by a variable reference source generally designated 38. As herein shown source 38 is in the form of a potentiometer 30 connected between a B+ supply and ground, the wiper 42 of potentiometer 40 being connected to the input of comparator 36 to provide the reference signal.

Comparator 36 is effective to compare its two input signals and to produce at its output at line 44 a stall warning signal whenever the angle of attack signal, $\alpha + K(d\alpha/d\tau)$, equals or exceeds the reference signal level. Line 44 is connected to a stall warning indicator 46 which is preferably located in the cockpit. When the stall warning signal is produced, indicator 46, which may, for example, be a lamp, buzzer or horn, is actuated, indicating to the pilot that at the then existing rate of deceleration of the aircraft, a stall condition will occur if no appropriate corrective measures are taken within a predetermined period of time, which may conveniently be selected as 5 seconds. This time period is determined by the weighting factor K of amplifier 28 and the level of the reference signal applied to the comparator 36 from reference source 38. Either or both of these factors may be adjusted to meet desired system operating parameters, to wit, the time warning to be provided prior to the occurrence of a stall.

The angle of attack measuring device 10 may, as herein shown, comprise a vane 48 positioned in the airflow direction path of the aircraft. Vane 48 is mounted on the end of an arm 50 which in turn is secured to a shaft 52. A counterweight 54 may also be mounted on shaft 52. To provide the electrical analog signal representative of the aircraft angle of attack, a potentiometer 56 may be provided to which a suitable potential may be applied from a voltage source (not shown). A brush 58 is secured to shaft 52 and line 12 is connected to brush 58. As vane 48 moves, it causes shaft 52 and brush 58 to rotate, thereby producing at line 12 the electrical analog signal proportional to the angular position of vane 48 and thus of the aircraft angle of attack. A more detailed description of the angle of attack measuring vane and its manner of operation is given in U.S. Pat. No. 3,190,115 entitled "Angle of Attack Measuring Device."

The stall warning system of the present invention thus produces a stall warning indication representing a predetermined time remaining for the pilot to take correct, stall-preventing measures. This time period is set to enable even a preoccupied pilot to do whatever is necessary in the time provided. Significantly, that time warning period is constant for the system once it is adjusted, and does not vary for different flight conditions, e.g., deceleration of the aircraft.

The system is reliable, compact and easy to install on practically all types of aircraft, both private and commercial. It may be purchased and installed by the owner as a complete unit, or may be incorporated into an already existing angle of attack indicating system such as one already including the vane 48 and the angle of attack indicator 18.

If desired, for purposes of economy, the input to the comparator may be only the differentiated angle of attack signal produced by differentiator 22 and amplified by a suitable weighting factor K at amplifier 28. While this system would provide less meaningful information to the pilot, it would obviate the need for amplifier 32 and summer circuit 30.

The circuitry for the various operative sections of the system of the present invention (filters, amplifiers, differentiator, buffer, summer, comparator) may take various standard forms, all as is well known to those versed in the art. It is for that reason that the disclosure here is in block diagram form.

It will be apparent that other variations to the system of the present invention may be made, all within the spirit and scope of the invention.

We claim:

1. A stall warning system for use on an aircraft comprising angle of attack sensing means effective to produce a first signal corresponding in magnitude to the angle of attack of the aircraft, means to produce a second signal corresponding in magnitude to the existing rate of change of the angle of attack of the aircraft, and means to combine said first and second signals to provide a signal whose magnitude varies as a function of both angle of attack and rate of change of angle of attack in a direct relationship, said combined signal thereby inversely indicating the time remaining until the angle of attack reaches stall at the existing rate of change of angle of attack, means to provide a reference signal which can be correlated to said combined signal, and means to produce a warning signal when said combined signals bear a predetermined relation to said reference signal, said warning signal thereby indicating the time left until stall occurs at the existing rate of change of angle of attack when the combined signal bears said predetermined relationship to the reference signal.

2. The system of claim 1, in which said signal combining means comprises means effective to operatively sum said first and second signals and to produce said combined signal corresponding to said operative sum.

3. The system of claim 2, comprising variable means operatively interposed between said second signal producing means and said summing means and effective to adjust the level of said second signal by a predetermined factor.

4. The system of claim 3, further comprising means effective to adjust the level of said reference signal.

5. The system of claim 1, comprising variable means operatively interposed between said second signal producing means and said means to combine said first and second signals and effective to adjust the level of said second signal by a predetermined factor.

6. The system of claim 5, further comprising means effective to adjust the level of said reference signal.

7. The system of claim 1, further comprising means effective to adjust the level of said reference signal.

8. A stall warning system for use on an aircraft comprising means effective to produce a variable signal corresponding in magnitude to the existing rate of change of the angle of attack of said aircraft, means to produce a separate signal which is proportional to the angle of attack of said aircraft, means to combine said variable signal with said separate signal to produce a combined signal, said combined signal varying as a function of the magnitude of the separate signal and the rate of change of angle of attack in a direct relationship, means to produce a reference signal which may be correlated to the combined signal, and means effective to produce a stall warning signal when the magnitude of said combined signal bears a predetermined relation to said reference signal to thereby give a stall warning signal a preselected time before stall conditions occur at the sensed rate of change of angle of attack when the stall warning signal is produced.

9. A method of delivering a stall warning for an aircraft a preselected time prior to stall under differing aircraft operation parameters comprising the steps of providing a first signal corresponding to the angle of attack of the aircraft, providing a second signal corresponding to the existing rate of change of the angle of attack of the aircraft, combining said first and second signals to produce a combined signal indicative of the sum of values of said first and second signals, comparing said combined signal with a reference signal and providing a warning signal when said combined signal bears a predetermned relationship to said reference signal to indicate the time remaining until stall of the aircraft occurs at the existing rate of change of angle of attack when said combined signal is at said predetermined relationship to said reference signal.

10. The method of claim 9 including the step of combining said first and second signals by summing the signals.

* * * * *